(12) United States Patent
Tijerina Ramos

(10) Patent No.: US 11,230,486 B2
(45) Date of Patent: Jan. 25, 2022

(54) INVERTING MECHANISM FOR A MACHINE FOR SHAPING GLASS ITEMS

(71) Applicant: Vitro, S.A.B. de C.V., Monterrey (MX)

(72) Inventor: Victor Tijerina Ramos, Monterrey (MX)

(73) Assignee: Vitro, S.A.B. de C.V., Nuevo León (MX)

( * ) Notice: Subject to any disclaimer, the term of this patent is extended or adjusted under 35 U.S.C. 154(b) by 188 days.

(21) Appl. No.: 16/495,486

(22) PCT Filed: Aug. 2, 2017

(86) PCT No.: PCT/MX2017/000088
§ 371 (c)(1),
(2) Date: Sep. 19, 2019

(87) PCT Pub. No.: WO2018/174703
PCT Pub. Date: Sep. 27, 2018

(65) Prior Publication Data
US 2020/0017390 A1    Jan. 16, 2020

(30) Foreign Application Priority Data

Mar. 23, 2017 (AR) .......................... AR20170100723

(51) Int. Cl.
*C03B 9/16*        (2006.01)
(52) U.S. Cl.
CPC .................................. *C03B 9/165* (2013.01)
(58) Field of Classification Search
None
See application file for complete search history.

(56) References Cited

U.S. PATENT DOCUMENTS

| 3,149,951 | A |   | 9/1964 | Mennitt et al. |
| 3,445,218 | A | * | 5/1969 | Trudeau ................. C03B 9/165 65/235 |
| 4,588,068 | A | * | 5/1986 | Nebelung ............... C03B 9/165 198/403 |
| 5,843,201 | A |   | 12/1998 | Borbone et al. |

(Continued)

FOREIGN PATENT DOCUMENTS

| CO | 7580536 | 4/2016 |
| EP | 0997443 A2 | 5/2000 |

(Continued)

*Primary Examiner* — Erin Snelting
(74) *Attorney, Agent, or Firm* — The Webb Law Firm

(57) ABSTRACT

An inverting mechanism of a glass forming machine includes: a supporting structure; a shaft horizontally located over the upper portion the supporting structure; drive means coupled to a shaft to provide rotational movement to the shaft; a cylindrical body having a longitudinal opening in an eccentric reference axis, which is coupled to the shaft through its longitudinal opening, in an eccentric position; at least one hollow cylinder coupled with each cylindrical body having attached supports to its outer part which are connected to neck ring holder arms so that, by means of a first sliding movement of the hollow cylinder on the cylindrical body, it provides a lateral movement to open and close the neck ring holder arm supports in parallel and, by means of a rotational movement, it moves the neck ring holder arms with a 180° movement from a parison mold to a finish blow mold.

6 Claims, 6 Drawing Sheets

(56) References Cited

U.S. PATENT DOCUMENTS

| | | | |
|---|---|---|---|
| 5,968,218 A | 10/1999 | Perry | |
| 6,314,762 B1 * | 11/2001 | Kirkman | C03B 9/165 65/236 |
| 7,047,766 B2 | 5/2006 | Schneider et al. | |
| 7,185,515 B2 | 3/2007 | Shue et al. | |
| 7,779,650 B2 | 8/2010 | Tijerina-Ramos et al. | |
| 2003/0110806 A1 | 6/2003 | Voisine et al. | |
| 2003/0221456 A1 | 12/2003 | Leidy et al. | |
| 2005/0005647 A1 * | 1/2005 | Shue | C03B 9/40 65/260 |
| 2008/0141718 A1 * | 6/2008 | Mohr | C03B 9/165 65/260 |
| 2016/0107918 A1 | 4/2016 | Delgado Carranza | |

FOREIGN PATENT DOCUMENTS

| | | | |
|---|---|---|---|
| GB | 979713 A | | 1/1965 |
| GB | 2139998 A | | 11/1984 |
| GB | 2367875 A | | 4/2002 |
| JP | S5591542 A | | 7/1980 |
| JP | S57185727 U | | 11/1982 |
| JP | H02145443 A | | 6/1990 |
| JP | 2001172027 A | | 6/2001 |
| RU | 2198143 C2 | | 2/2003 |
| WO | 2008073204 A1 | | 6/2008 |

* cited by examiner

INVERTING MECHANISM FOR A MACHINE FOR SHAPING GLASS ITEMS

CROSS-REFERENCE TO RELATED APPLICATIONS

This application is the United States national phase of International Application No. PCT/MX2017/000088 filed Aug. 2, 2017, and claims priority to Argentina Patent Application No. 20170100723 filed Mar. 23, 2017, the disclosures of which are hereby incorporated by reference in their entirety.

FIELD OF THE INVENTION

The present invention relates to the production of glassware and, more specifically, to an inverting mechanism for a glassware forming machine which includes multiple individual forming sections for the production of glass bottles, wide-mouth jars, glasses and other glassware by blow-blow, press-blow, press-blow or direct press processes.

BACKGROUND OF THE INVENTION

Glassware such as narrow neck glass are usually produced in glassware forming machines such as those which can include multiple similar individual forming sections by blow-blow process, while wide-mouth jars, glasses and other glassware are produced in forming machines known as Series "E" and "F" through the press-blow process, so-called "hot mold".

During the glass containers manufacturing process by means of the blow-blow or blow press process, the gob glass is introduced into a parison or preformed mold, where, depending on the process, the gob settles by means of a blowing or vacuum process to the lower part of the parison mold to form the crown of the container. Then, once the container crown is formed, a counter-blow is made to form a parison or preform of the container. Subsequently, the container preform is transferred by an inverting mechanism with a 180 degree move of the parison mold to a final blow where final shape is given to the container.

Within the forming process, one of the main mechanisms of the forming machines is the inverting mechanism which, in addition to transferring the item from the parison mold to the blow mold, has the integrated function of opening and closing a pair of crown holder holding arms to retain a transferable crown mold which is able of opening and closing during the forming action of the container and to retain the item in its reversion from the parison mold to the blow mold.

Examples of glassware transfer mechanisms are shown, for example, in U.S. Pat. No. 5,843,201, by Joseph A. Borbone et al, refers to an invert and neck ring holder mechanism for displacing a parison from a blank station to a blow station. The invert and neck ring holder mechanism has an opposed pair of side brackets, a worm gear housing supporting a worm gear, and a motor/worm housing for supporting the worm gear housing intermediate the opposed side brackets. The invert and neck ring holder mechanism also has a pair of cylinder assemblies extending between the sides of the worm gear and the side brackets. The cylinder assemblies include a cylinder having a support. Each cylinder is axially displaceable from a first location adjacent the worm gear to a second location adjacent the associated side bracket and rotationally displaceable to displace its neck ring holder support from a first position at the blank station to a second position at the blow station.

A first switch indicates that said first cylinder assembly cylinder is proximate its associated side bracket, a second switch indicates that the first cylinder assembly neck ring holder support is at the first position, a third switch indicates that the second cylinder assembly cylinder is proximate its associated side bracket, and a fourth switch indicates that the second cylinder assembly neck ring holder support is at the second position.

The U.S. Pat. No. 7,047,766 by Wilhelm Schneider et al, an invert mechanism for moving parisons between a preforming station and a finishing forming station of a glass forming machine is disclosed. The mechanism is disposed above a cover plate of a frame of the glass forming machine. An electric motor is disposed with its horizontal longitudinal axis above the cover plate. A driven shaft of the electric motor is connected to a horizontal invert shaft by means of a transmission. Between the driven shaft of the electric motor and the transmission a planetary gear is connected.

U.S. Pat. No. 7,185,515 by Larry N. Shue, et al, describes an invert assembly for an individual section glassware forming machine includes an invert base that is oscillated about an axis between angularly spaced apart first and second positions, a double ended ball screw positioned co-axially with the axis and having spaced apart oppositely threaded portions, first and second nuts each threadably engaging one of the oppositely threaded portions of the ball screw so that the nuts reciprocate toward and away from each other in response to rotation of the ball screw, and first and second neck ring arms respectively engaging the first and second nuts so that the neck ring arms reciprocate toward and away from each other along the axis with the first and second nuts. Preferably, the invert base is oscillated about the axis by a first reversible electric motor, and the ball screw is driven for rotation in opposed directions by a second reversible electric motor to move the nuts and neck ring arms toward and away from each other along the axis.

Finally, U.S. Pat. No. 7,779,650 of Victor Tijerina, et al, is related to a method and machine for the production of hollow glassware, such as bottles, jars, cups and other glass items, by the blow-and-blow, press-and-blow, press-and-blow and direct press processes in glassware forming machines including among their multiple mechanisms, a parison forming station including a blank mold, an inverting mechanism including at least one open-able horizontal holding arm and at least one transferable and open-able neck ring mold, per cavity, removable held by the horizontal holding arm of the inverting mechanism, to be initially placed under the blank mold to form a parison which is held by said transferable and open-able neck ring mold once formed and transferred by the inverting mechanism from this parison forming station to an intermediate station at an upright orientation.

Traditionally, inverting mechanisms include an opening and closing neck ring arm mechanism consisting of a rotary cylinder divided into two sections that have a series of internal longitudinal slots or horizontal grooves. One pair of neck ring retention arms is connected to each section of the rotary cylinder to open and close the neck ring retention arms and the neck ring holder molds in parallel. Each rotary cylinder section, through its slots or longitudinal grooves, is respectively coupled on cylindrical bodies including upper longitudinal slots. Each body is coupled to a central shaft, which are separated by an intermediate gear or neck ring of a reducer connected to a set of piston cylinder to rotate the arrow and, the cylindrical bodies and each rotary cylinder section, move the neck ring arms with a 180° degrees from that parison mold to a final blow mold.

The parallel opening of the neck ring retention arms, and the neck ring molds for neck ring mold retention and release is carried out by pneumatically moving each rotary cylinder section over the cylindrical bodies, from a first central position in coincidence with the lateral faces of the intermediate gear or neck ring of a reducer, to a left and right position respectively. Springs at the ends of the shafts allow the cylinder sections to be returned to their original position once the pneumatic actuation flow is suspended.

The upper longitudinal slots of the cylindrical bodies and the internal longitudinal slots or grooves of the rotary cylinders of the arm holders transmit torque or turning force to the crown arms and allow the rotary cylinders to longitudinally slide over the cylindrical bodies during the opening and closing of the arm holders.

However, one of the main problems with the coupling of the above-mentioned parts by means of slots or longitudinal grooves is that, because compressed air is used to open the neck ring arms, air pressure is lost through the junction of the grooves because, when a certain clearance is maintained, the air escapes through small gaps between them, as there is no complete seal as far as the teeth of the grooves are concerned.

Another disadvantage found with respect to coupling the grooves is in terms of their manufacture, since it is necessary to manufacture an internal groove (for the rotary cylinders of the arm holders) and an external longitudinal groove in the upper part of the cylindrical bodies, which requires a lot of time and precision of machining since, if there is too much play between grooves, there is greater air escape and if the joint is too tight they get stuck.

An additional disadvantage is that, due to the constant displacement of the neck ring arm (with a movement of 180 degrees) or to open or close the neck ring arms, the slots or grooves are worn and therefore, when there is variation between the teeth, the torque applied causes certain variations in the movement of the mechanism, which even though they may be in the range of thousandths, affects the angle point of calibration of the arm.

SUMMARY OF THE INVENTION

In order to simplify the construction of the parts constituting the inverting mechanism and specifically the step of opening and closing the neck ring holder arms, as well as facilitating their manufacture and assembly, the present invention refers to an inverting mechanism for a glassware forming machine which is easy to build and increases the life of the changes.

The objective of the inverting mechanism of the present invention is to minimize the wear between parts (backlash), during its transfer movement, as well as, to open or close the arms.

Another main objective of the present invention, is to provide an inverting mechanism for a glass forming machine, which reduces the leakage of compressed air to open and close the neck ring holder arms to zero.

An additional objective of the inverting mechanism for a glassware forming machine of the present invention, which uses eccentric guides mounted on a central shaft which, at the moment of rotation, automatically moves the rotating cylinders of the arms, thereby replacing the coupling system based on slots or grooves.

An additional objective of the inverting mechanism for a glassware forming machine of the present invention, which utilizes a double-envelope transmission system (worm screw and gear wrap around each other), considerably increasing the load capacity by providing more contact with the tooth area and more mesh teeth than any other worm gear design.

These and other objectives and advantages of this invention shall be apparent to those having ordinary capabilities in the field, from the following description of a specific and preferred mode of the invention, provided in combination with the accompanying drawings.

DETAILED DESCRIPTION OF THE INVENTION

Referring now to the inverting mechanism of a glassware forming machine, a reference will then be made to a mechanism of the previous art, shown in FIGS. 1 to 3 and, subsequently, the improvements related to the inverting mechanism of the present invention will be described in detailed from FIGS. 4 to 7.

Description of Previous Art

Figure 1:
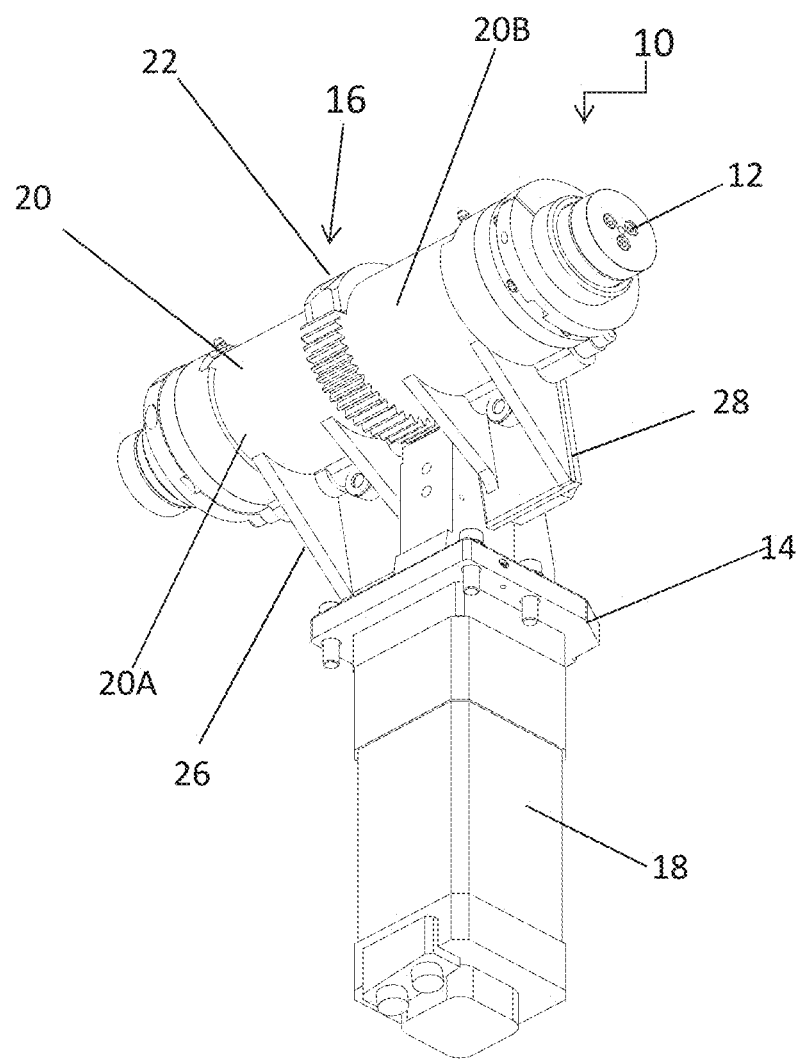
FIG. 1 is a perspective view of an inverting mechanism according to the prior art.

An inverting mechanism 10 is shown in general form as shown in FIG. 1. The inverting mechanism 10, according to the previous art, is coupled to rotate on a shaft 12, in horizontal position, in the upper part of a support structure 14. Shaft 12 being coupled to a straight gear or ring neck transmission and rack 16 driven by a servo motor 18.

Figure 2:
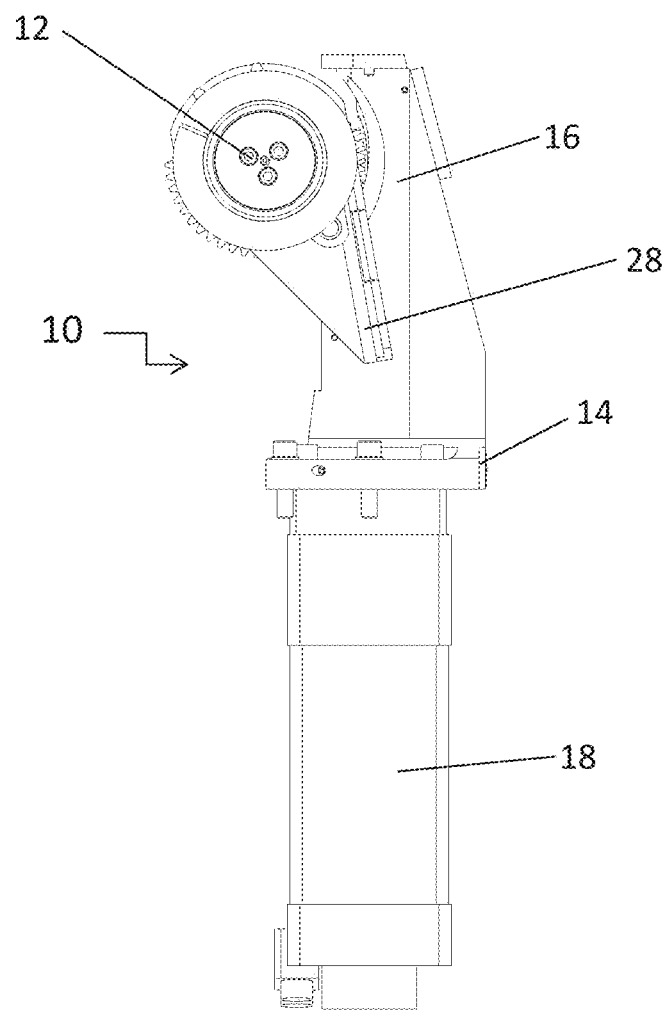
FIG. 2 is a side view of FIG. 1, in accordance with the above prior art.
Figure 3:
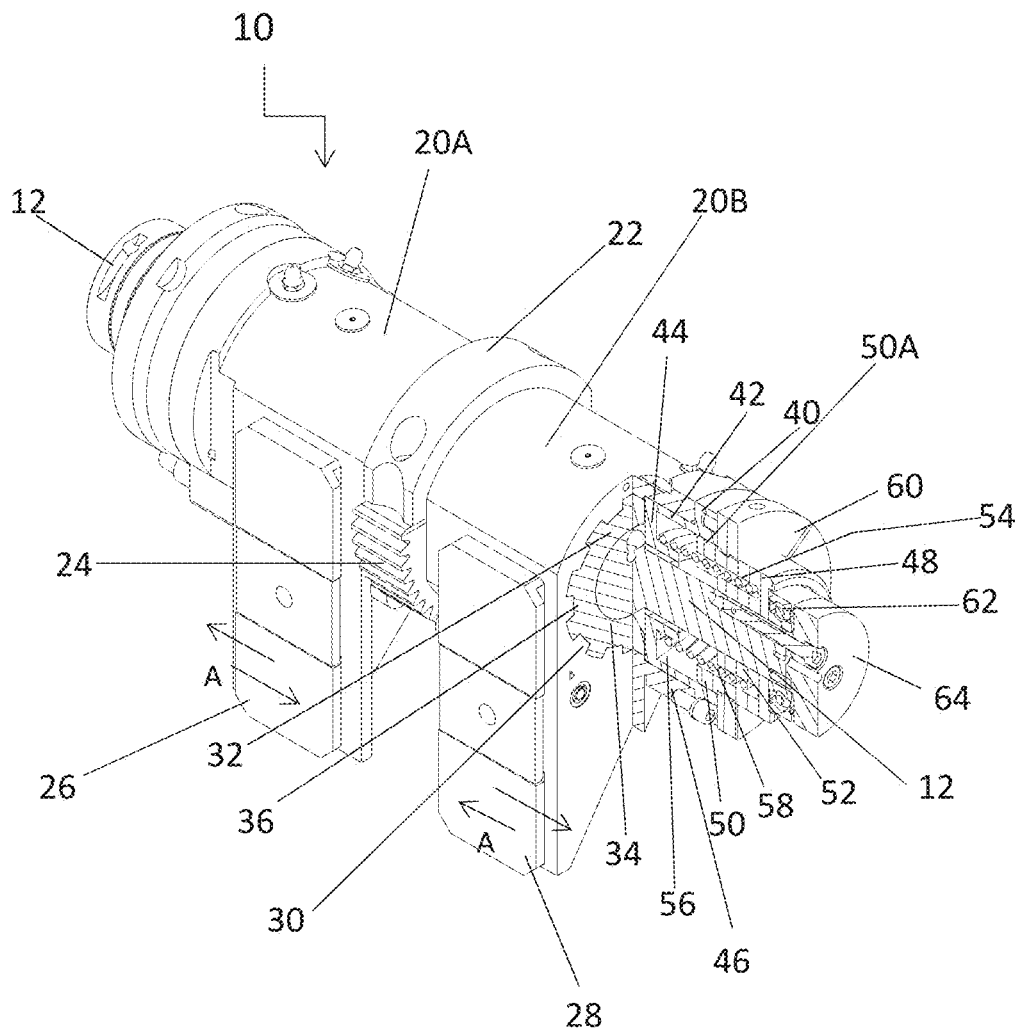
FIG. 3 is a detailed view of the inverting mechanism shown in FIG. 1, according to the prior art.
Figure 4:
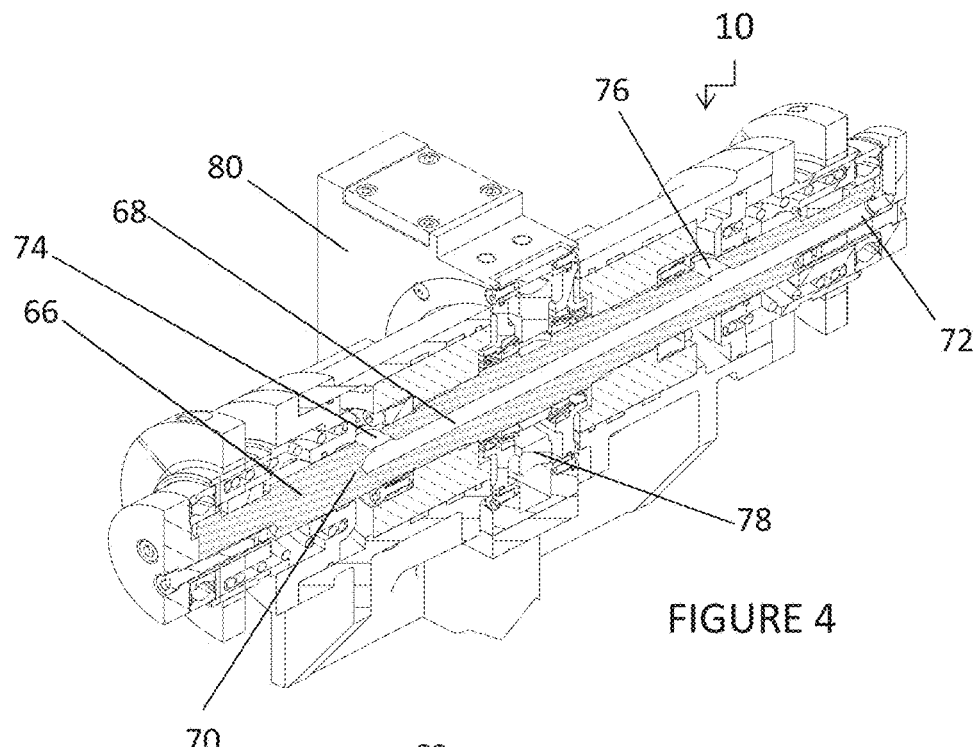
FIG. 4 is a conventional perspective view, in longitudinal section, showing in detail the components of the inverting mechanism in accordance with the present invention.
Figure 5:
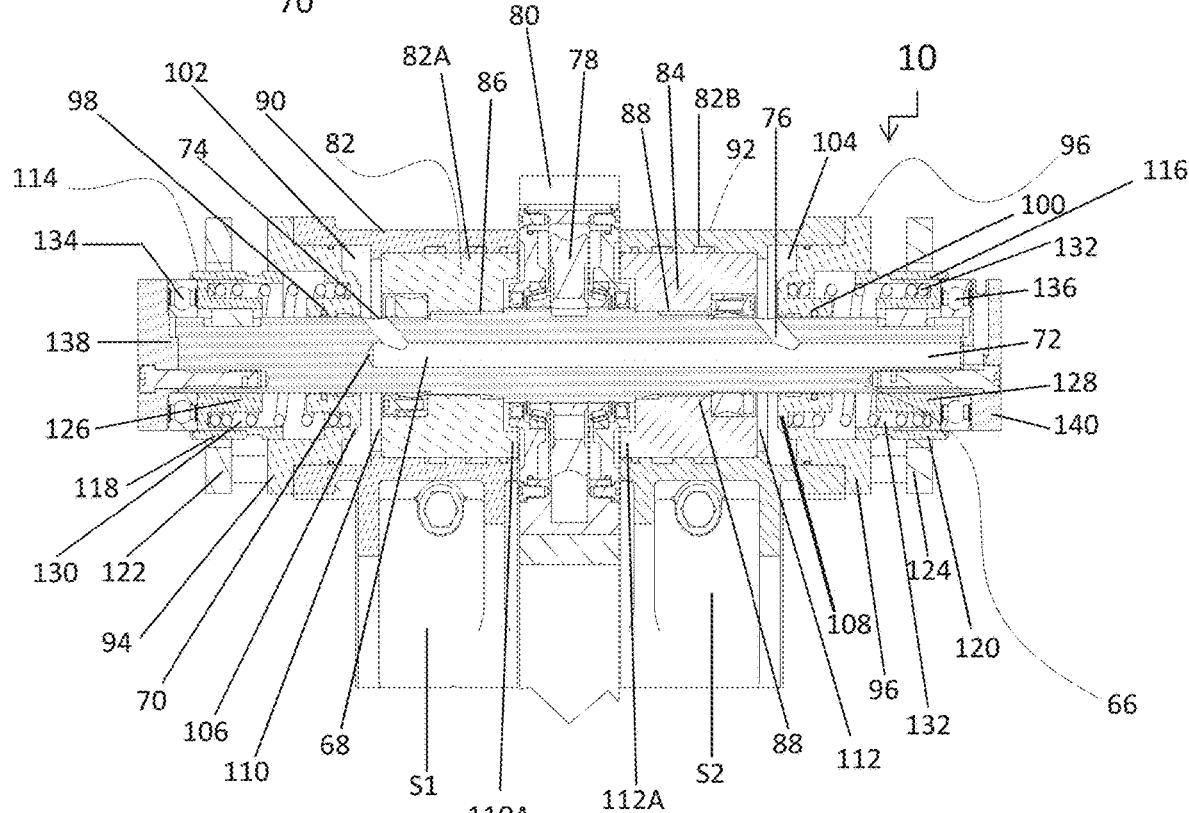
FIG. 5 is a side view, showing in detail the components of the inverting mechanism in accordance with the present invention.
Figure 6:
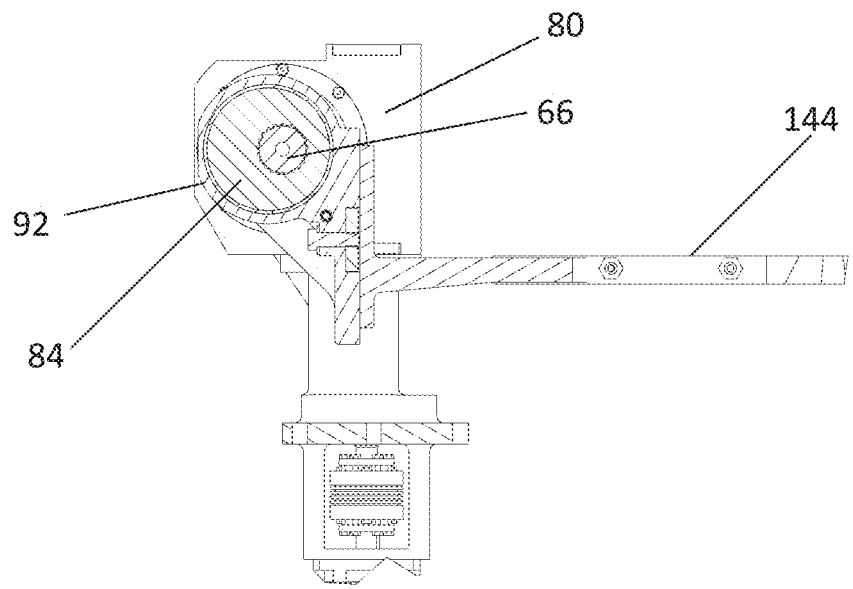
FIGS. 6 and 7, are seen in side-cut, showing the movement of the inverting mechanism, in accordance with the present invention; and, FIG. 8 is a side sectional view of the motion transmission system of the inverting mechanism of the present invention.
Figure 7:
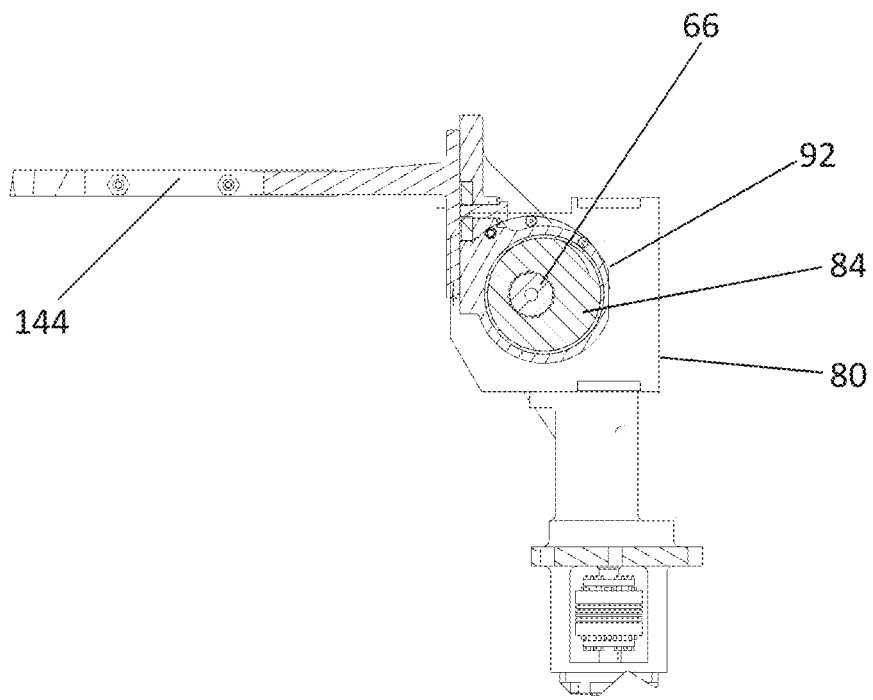

FIGS. 2 and 3 show in detail the inverting mechanism 10, which comprises a rotary cylinder 20, divided into two sections 20A and 20B, which are horizontally located with respect to the support structure 14. Sections 20A and 20B being independent cylinders separated by a spacer 22, which attaches to the gear or neck ring segment 24, as shown in more detail in FIG. 3. The independent rotary cylinders 20A and 20B, including respectively supports 26, 28, which are connected to neck ring arms (not shown) in order to open and close the neck ring retention arms and neck ring molds in parallel. Independent rotary cylinders 20A and 20B, including on the inside a series of longitudinal slots or horizontal grooves 30.

A cylindrical body 32 is internally coupled to each independent rotary cylinders 20A and 20B. Cylindrical bodies 32 having a central longitudinal hole 34 and, a series of longitudinal slots or grooves 36 on their outer surface. Independent rotary cylinders 20A and 20B are longer than cylindrical bodies 32.

Each independent rotary cylinder 20A and 20B, through its slots or longitudinal grooves 30 is assembled in coincidence with the upper longitudinal grooves 36 of the cylindrical bodies 32. Cylindrical bodies 32 are fixedly coupled through their central longitudinal hole 34 to shaft 12. Gear or neck ring 24 is coupled to shaft 12 separating each assembly of independent rotary cylinders 20A and 20B and cylindrical bodies 32. Gear segment or neck ring 24 is connected to a rack to the output shaft of servomotor 18 to rotate shaft 12 and thereby the cylindrical bodies 32 and each section of the independent rotary cylinder 20A and 20B and thus move the neck ring arms (not shown) with a 180-degree move from said parison mold to a finish blow mold.

The parallel opening of the neck ring retention arms (not shown), and the neck ring molds for neck ring mold retention and release (not shown) is accomplished by moving each section 20A and 20B by a pressurized flow of the independent rotary cylinder 20 on the cylindrical bodies 32, of a first central position coinciding with the side faces of gear 24, to a left and right position respectively, as schematically shown with arrows A in FIG. 3.

As shown in FIG. 3, each end of shaft 12 comprises an annular piston 40, which is fixedly located inside each section 20A and 20B of the independent rotary cylinder 20. The annular piston 40 having a hollow cylindrical body 42 and an upper section or head 44 that is located and coincided with inner part of longest end 46 of sections 20A and 20B. The upper section or head 44 of the annular piston 40 being in coincidence with one of the faces of the cylindrical bodies 32. Between the upper section or head 44 and the face of the cylindrical body 32, a chamber (not shown) is formed for the introduction of compressed air to move and slide laterally from the center outwards (left and right respectively) each section 20A and 20B of the independent rotary cylinder 20 on the cylindrical bodies 32.

Cover 48 located in opposite position to annular piston 40, includes an external cylindrical wall 50, which has a stop section 50A in one of its ends, and an internal cylindrical wall 52, leaving a hollow space 54 between each of them. External cylindrical wall 50 of cover 48 is located on the internal part of the hollow cylindrical body 42 of the annular piston 40. Inner cylindrical wall 52, is placed in coincidence with longitudinal surface of shaft 12. The joint of annular piston 40 and cover 48 form a hollow space 56 where a spring 58 is located.

An outer cover or cap 60, with an inner hole, is fitted at the outside end of annular piston 40 surrounding cap 48, to limit outward move of cap 48 through stop 50A.

Finally, ball bearing 62 is located at the end of shaft 12, which is located in coincidence with outer end of cover 48. A fixed cover 64 attached to the end of shaft 12, retains ball bearing 62, so the inverting mechanism 10 can rotate on shaft 12.

By means of this arrangement, when the forming process requires opening the neck ring arms (not shown), compressed air is introduced into the chamber (not shown) defined between the upper section or head 44 and the face of the cylindrical body 32 to move and laterally slide from the center outwardly each of sections 20A and 20B of the independent rotary cylinder 20 over the cylindrical bodies 32. During this action springs 58 are compressed.

Once articles have been released, the air flow is suspended and springs 58 at the ends of shaft 12 allow sections 20A and 20B of the independent rotary cylinder 20 to be retracted to their original position.

Description of Preferred Embodiment of the Present Invention

Referring now to FIGS. 4 to 7, it shows the inverting mechanism 10 in accordance with the present invention, comprises: a shaft 66 in a horizontal position, to rotate on its own axis provided with a central longitudinal passage 68 with a closed end 70 and an open end 72. Shaft 66 has two exit passages 74, 76, separated at a certain distance, which are projected from the central part of the central passage 68 towards the superficial part of shaft 66, said central passage 68 and exit passages 74, 76, receiving a flow of pressurized fluid.

A gear or crown 78 is fixedly coupled to the central part of shaft 66 which will be connected to a transmission mechanism 80 (as will be described later with respect to FIG. 8), to rotate said shaft 66 on its own axis with a rotational movement to the left or to the right.

A cylindrical guide body 82, 84, having a front face 110, 112 and a rear face 110A, 112A, this cylindrical body has a longitudinal hole 86, 88, in an eccentric reference axis, along its entire body. These cylindrical bodies guide 82, 84, are fixedly coupled to shaft 66, through its longitudinal hole 86, 88, in an eccentric position.

Each cylindrical guide body 82, 84, having circular slots 82A, 82B, on its outer surface to receive sealing rings (not shown) and seal air leaks, as described below. The cylindrical guide bodies 82, 84, are placed on each side of the faces of the gear or crown 78.

A hollow cylinder 90, 92, is externally coupled to each cylindrical guide body 82, 84, covering the sealing rings. Each hollow cylinder 90, 92, are coupled to each cylindrical guide body 82, 84, to be movable with a lateral movement outwards and inwards.

Hollow cylinders 90, 92, including respectively supports S1, S2, which are connected to neck ring arms (not shown), in order to open and close the neck ring retention arms and neck ring molds in parallel. Hollow cylinders 90, 92, being of greater length than the cylindrical guide bodies 82, 84.

A cover 94, 96 have an eccentric hole 98, 100, attached to each end of shaft 66. The periphery of the cover 94, 96 being fixedly coupled to the end of each hollow cylinder 90, 92. Opening 98, 100, in eccentric position, being aligned on the same reference axis with respect to the eccentric longitudinal hole 86, 88 of each cylindrical guide body 82, 84. Cover 94, 96, being slidable on the shaft 66 with a lateral movement outwards or inwards and being rotatable together with hollow cylinders 90, 92. A chamber 102, 104, is formed between rear side 106, 108, of cover 94, 96, and front part 110, 112, of the cylindrical guide body 82, 84.

Two exit passages 74, 76 of shaft 66 being in coincidence with each chamber 102, 104, so that, when introducing a flow of air to pressure or compressed air by each central passage 68 of shaft 66, the air passes towards chambers 102, 104, and moves the assembly of each cover 94, 96, and cylindrical guide body 82, 84, with said lateral movement towards outward, to open neck ring holder arms (not shown).

A stroke adjustment tube 114, 116, located in opposite position to each cover 94, 96, includes an external cylindrical wall 118, 120, with a stop section 122, 124, at one of its ends, to limit the lateral movement of the sliding cover 94, 96, and an internal cylindrical wall 126, 128, leaving a hollow space 130, 132 between each of them. External cylindrical wall 118, 120 of the stroke adjustment tube 114, 116, is located inside cover 94, 96. Stop section 122, 124, being an adjustable nut to adjust the lateral displacement of cover 94, 96.

The inner cylindrical wall 126, 128 is placed in coincidence with peripheral surface of shaft 66. The connection of the stroke adjustment tube 114, 116 and the sliding cover 94, 96, forms a hollow space where spring 130, 132 are located.

Finally, ball bearing 134, 136 is located at each end of shaft 66, which is located in coincidence with the outer end of the stroke adjustment tube 114, 116. Cover 138, 140, attached to each end of shaft 66, retains ball bearing 134, 136, so the entire assembly of an inverting arm (not shown) and the opening and closing neck ring holder mechanism 10 can rotate on shaft 66.

The parallel opening of neck ring retention arms (not shown), and neck ring molds for the neck ring mold retention and release is carried out by displacing each of the hollow cylinders 90, 92, by means of pressurized air or compressed air, on the cylindrical guide bodies 82, 84, from a first central position in coincidence with the lateral faces of gear 78, to a left and right position respectively, to open the neck ring holder arms (not shown).

Once the articles are released, the air flow is suspended and the springs 130, 132, at the ends of shaft 66, allowing each hollow cylinder 90, 92, to be retracted to its original position, so the inverting mechanism start its 180 degrees move.

Once the movement of the inverting mechanism is initiated (FIG. 6) and, because the cylindrical guide body 82 has an eccentric longitudinal hole 86, the variation of centers between shaft 66 and each cylindrical guide body 82, causes at the time of rotation of shaft 66, the cylindrical guide body 82 moves eccentrically with respect to the hollow cylinders 90, forcing said hollow cylinders 90, to follow the torque of shaft 66, without affecting the geometric position of the inverting arm 144.

Figure 8:
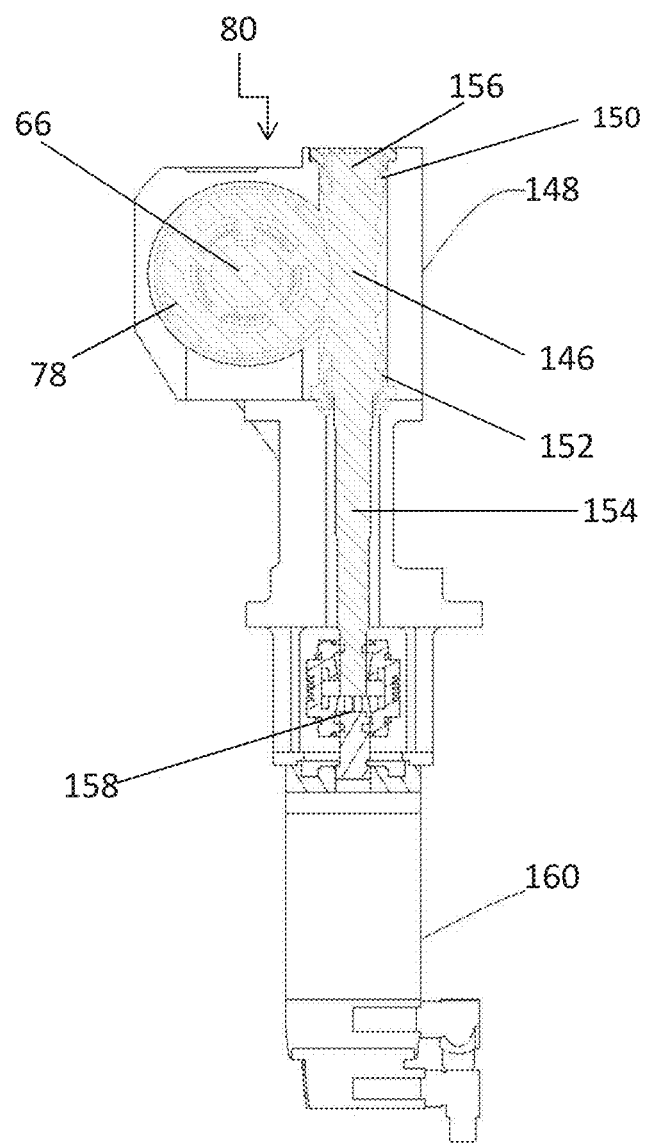

As illustrated in FIG. 8, the gear or crown 78 is fixedly coupled to shaft 66. The gear or crown 78 being connected to a double-envelope worm screw 146, that is, under this concept, the worm screw 146 surrounds gear or crown 78, which increases the load capacity providing greater contact to the area of the teeth of the gear 78, which allows to increase the torque without increasing the size of it. Worm screw 146 is coupled to rotate on support structure 148, between an upper bearing 150 and a lower bearing 152, located on support structure 148.

Shaft 154 has an upper end 156 and a lower end 158, this shaft 154 is located upright in support structure 148 to rotate on its own axis with a rotational movement to the left or to the right. The upper end 156 of the shaft 154 is fixed to worm screw 146 and the lower end of shaft 150 is connected to a servomotor 160. Motor 160 provides a rotational movement to shaft 150 and double envelope worm gearing 146 and thus providing a gear or crown 78 movement.

As can be seen from the above, it has been described an embodiment of an inverting mechanism for a glassware forming machine and it will be evident to the experts in the field, that many other characteristics or improvements could be made, which could be considered within the field determined by the following claims.

The invention claimed is:

1. An inverting mechanism for a glassware forming machine comprising:
    a supporting structure;
    a shaft horizontally located on an upper part of the supporting structure to rotate on a horizontal axis of the shaft, said shaft including a longitudinal central passage with a closed end and an open end and, at least one exit passage connecting a central part of the central passage towards a surface part of the shaft, for introduction of a fluid under pressure;
    drive means coupled to the shaft to provide rotational movement to the shaft, on the horizontal axis of the shaft, left or right relative to the horizontal axis of the shaft;
    at least one cylindrical body having a front face and a rear face, each cylindrical body having a longitudinal hole in an eccentric reference axis, each cylindrical body being fixedly coupled to the shaft through its longitudinal hole, in an eccentric position;
    at least one hollow cylinder coupled to each cylindrical body, each hollow cylinder having supports coupled on an outer part of each hollow cylinder, which are connected to neck ring holder arms so that, by means of a first sliding movement of each hollow cylinder on each cylindrical body, provides a lateral movement right or left to open and close the supports of the neck ring holder arms in parallel and, by means of a rotational movement, to move the neck ring holder arms with a 180° movement from a parison mold to a final blow mold;
    at least one cover with one hole in eccentric position, each cover being coupled by means of its eccentric hole to a section of the shaft and, by a periphery of each cover, being fixedly coupled and coinciding with one end of each hollow cylinder, each cover sliding together with each hollow cylinder, wherein the front face of each cylindrical body and each cover form an intermediate chamber for an inlet of a fluid under pressure through the longitudinal central passage and each exit passage of the shaft, said chamber being in coincidence with each exit passage of the shaft;
    at least one adjustment element attached to the shaft and located in facing position with each cover, wherein coupling of each adjustment element and each cover forms a hollow internal space therebetween; and,
    retracting means located in said hollow internal space to provide a retracting motion to each hollow cylinder and to each cover sliding on said shaft, at a time of interrupting the fluid pressure, to parallelly close the supports of the neck ring holder arms.

2. The inverting mechanism as claimed in claim 1, wherein the at least one cylindrical body comprises at least one slot on all of a periphery of each cylindrical body and, sealing rings for each slot.

3. The inverting mechanism as claimed in claim 1, wherein the front face of each cylindrical body and each cover are aligned with respect to a periphery of each cylindrical body and a periphery of each cover in a relationship one behind the other, in such a way that when the shaft is rotated, each cover and each cylindrical body move each hollow cylinder with an eccentric movement.

4. The inverting mechanism as claimed in claim 1, wherein each adjustment element comprises an adjustable nut.

5. The inverting mechanism as claimed in claim 1, wherein the drive means comprises:
    a gear or toothed crown fixedly coupled to the shaft;
    a worm screw attached to the gear or toothed crown, said worm screw being located to freely rotate on the supporting structure;

a rotating shaft having a first end and a second end, the worm screw being fixedly connected to the first end of the rotating shaft, the rotating shaft being placed in the supporting structure to rotate on a horizontal axis of the rotating shaft with a rotational movement left or right relative to the horizontal axis of the rotating shaft; and, a motor connected at the second end of the rotating shaft to provide a simultaneous rotational movement to the rotating shaft and worm screw to provide a rotational movement to the gear or toothed crown.

6. The inverting mechanism as claimed in claim 5, where the worm screw is of a double-envelope type.

* * * * *